(12) United States Patent
Nilsson et al.

(10) Patent No.: US 11,473,921 B2
(45) Date of Patent: Oct. 18, 2022

(54) METHOD OF FOLLOWING A VEHICLE

(71) Applicant: Ningbo Geely Automobile Research & Development Co., Ltd., Ningbo (CN)

(72) Inventors: Magnus Nilsson, Floda (SE); Måns Pihlsgård, Gothenburg (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 0 days.

(21) Appl. No.: 17/323,852

(22) Filed: May 18, 2021

(65) Prior Publication Data
US 2021/0270625 A1 Sep. 2, 2021

Related U.S. Application Data

(63) Continuation of application No. PCT/CN2019/119066, filed on Nov. 18, 2019.

(30) Foreign Application Priority Data

Dec. 17, 2018 (EP) .................................... 18212990

(51) Int. Cl.
*G01C 21/36* (2006.01)
*G06T 7/73* (2017.01)
(Continued)

(52) U.S. Cl.
CPC ....... *G01C 21/3602* (2013.01); *B60W 30/165* (2013.01); *B60W 50/14* (2013.01);
(Continued)

(58) Field of Classification Search
CPC ................ G01C 21/3602; G01C 21/36; G06T 2207/30252; G06T 7/73; G06V 10/255; G06V 2201/08; G06V 2201/07
(Continued)

(56) References Cited

U.S. PATENT DOCUMENTS 7,046,822 B1 5/2006 Knoeppel
2011/0251768 A1 10/2011 Luo
(Continued)

FOREIGN PATENT DOCUMENTS

CN 103732480 A 4/2014
CN 105023429 A 11/2015
(Continued)

OTHER PUBLICATIONS

International Search Report from corresponding International Application No. PCT/CN2019/119066, dated Feb. 5, 2020, 2 pages.

*Primary Examiner* — Nathnael Aynalem
(74) *Attorney, Agent, or Firm* — Tucker Ellis LLP

(57) ABSTRACT

A method for supporting a user of a first vehicle to follow a second vehicle includes obtaining a picture, by a camera, of at least a part of a surrounding of the first vehicle, detecting vehicles in the obtained picture, displaying a representation of the detected vehicles on a user interface to the user, obtaining input from the user from the user interface of which of the detected vehicles is the second vehicle and that the user would like to follow, obtaining, via the camera, at least one identification data of the second vehicle, tracking the position of the second vehicle, and transmitting the position of the second vehicle to a navigation system of the first vehicle.

17 Claims, 4 Drawing Sheets

(51) Int. Cl.
    *H04W 4/024*     (2018.01)
    *B60W 30/165*     (2020.01)
    *B60W 50/14*     (2020.01)
    *G06V 20/58*     (2022.01)
    *B60W 60/00*     (2020.01)

(52) U.S. Cl.
    CPC .............. *G06T 7/73* (2017.01); *G06V 20/584* (2022.01); *H04W 4/024* (2018.02); *B60W 60/001* (2020.02); *B60W 2050/146* (2013.01); *B60W 2420/42* (2013.01); *B60W 2554/804* (2020.02); *B60W 2554/806* (2020.02); *B60W 2556/45* (2020.02); *G06T 2207/30252* (2013.01); *G06V 2201/08* (2022.01)

(58) Field of Classification Search
    USPC .......................................................... 348/148
    See application file for complete search history.

(56) References Cited

U.S. PATENT DOCUMENTS

| | | | | |
|---|---|---|---|---|
| 2012/0050477 | A1* | 3/2012 | Karaoguz | H04N 13/111 348/46 |
| 2014/0270383 | A1* | 9/2014 | Pederson | G08G 1/207 382/104 |
| 2015/0125042 | A1* | 5/2015 | Haden | G06V 20/52 382/105 |
| 2016/0194003 | A1 | 7/2016 | Torii | |
| 2018/0217595 | A1 | 8/2018 | Kwon | |

FOREIGN PATENT DOCUMENTS

| | | | |
|---|---|---|---|
| CN | 105890601 A | | 8/2016 |
| CN | 106314434 A | | 1/2017 |
| CN | 105023429 B | * | 8/2017 |
| JP | 2002046501 A | | 2/2002 |
| TW | 200948648 A | * | 12/2009 |

* cited by examiner

METHOD OF FOLLOWING A VEHICLE

RELATED APPLICATION DATA

This application is a continuation of International Patent Application No. PCT/CN2019/119066, filed Nov. 18, 2019, which claims the benefit of European Patent Application No. 18212990.8, filed Dec. 17, 2018, the disclosures of which are incorporated herein by reference in their entireties.

TECHNICAL FIELD

The present disclosure relates generally to the field of driving instructions for a vehicle. More particularly, it relates to supporting a user of a first vehicle to follow a second vehicle.

BACKGROUND

When travelling in a group to a common destination, to avoid getting lost, one vehicle follows another vehicle. However, the effort of keeping a vehicle in sight may be hard and the user may be disturbed when keeping track on other vehicles on the road. Further, when a vehicle in the group changes routes, for example, to pull off a freeway for gas or food, they run the risk of the other vehicles in the group not noticing, causing confusion and lost time as the drivers try to reconnect with each other. A known solution to the above problem is that two vehicle are electronically connected and that the position of one of the vehicles is transferred to the other vehicle and used as a destination for a navigation system. This could be done by that both vehicles are using the same app-solution.

Therefore, there is a need for alternative approaches to supporting a user of a vehicle to follow another vehicle.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

An object of some embodiments and aspect is to provide alternative approaches to supporting a user of a vehicle to follow another vehicle.

A further object of some embodiments and aspect is to provide a solution of how a user of a vehicle could follow another vehicle without any requirements for the vehicles to be connected.

According to a first aspect, this is achieved by a method for supporting a user of a first vehicle to follow a second vehicle, comprising the steps of: obtaining a picture, by a camera, of at least a part of a surrounding of the first vehicle, detecting vehicles in the obtained picture, displaying a representation of the detected vehicles on a user interface to the user, obtaining input from the user from the user interface of which of the detected vehicles that is the second vehicle and that the user would like to follow, obtaining, via the camera, at least one identification data of the second vehicle, tracking the position of the second vehicle, and transmitting the position of the second vehicle to a navigation system of the first vehicle.

By the method according to the first aspect, the advantages of that a user of a first vehicle is able to follow a second vehicle without the vehicles being electronically connected. The method allows the user of the first vehicle to follow any of the vehicles that are in sight of the vehicle when starting and at the same time reduce the distraction of the user.

According to an aspect the step of tracking is at least based on identifying the second vehicle from the at least one detected vehicles based on identification data of the second vehicle, and assigning, to the second vehicle, at least one tracking metric determined by the camera.

According to an aspect the step of assigning at least one tracking metric comprise obtaining two or more pictures of the at least part of the surrounding of the first vehicle and identifying the position of the second vehicle based on identifying the identification data of the second vehicle in the pictures and determine the tracking metrics based on the position of the second vehicle in the two or more pictures. By comparing the positions of the second vehicle in two or more pictures and knowing the time of the different pictures, the tracking metric of the second vehicle could be calculated in an efficient way, for instance the direction and the speed that the second vehicle is moving in.

According to an aspect the tracking metrics is further determined based on input from one or more sensors of the first vehicle. By adding more input, the tracking metrics could be even more precise and the position of the second vehicle in relation to the first vehicle could comprise more information and thus enhance the tracking of the second vehicle.

According to an aspect the tracking metrics is one or more of a position, a speed, a heading, a distance and an angle of the second vehicle relative to the first vehicle.

According to an aspect the method comprises the step of inserting the position of the second vehicle as a destination for the navigation system of the first vehicle to guide the vehicle towards. The navigation system guides the user of the first vehicle to follow the second vehicle and a user of the first vehicle thus does not need to keep track of the actual position of the second vehicle, rather just following the instructions from the navigation system.

According to an aspect the step of obtaining comprise obtaining further identification data of the second vehicle during the tracking of the second vehicle. By continue to obtain identification data of the second vehicle also during the tracking, the possibility to track the second vehicle could be enhanced.

According to an aspect the identification data is assigned a confidence level score based on the uniqueness of the identification data. By having a confidence level score the tracking could be enhances since it could be based on more reliable identification data in comparison to other identification data. If all identification data have the same confidence level score, the tracking could be misled to follow the wrong vehicle in some cases.

According to an aspect the method further comprise the step of comparing the obtained identification data of the second vehicle to identification data of a number of pre stored vehicle models, to identify a vehicle model of the second vehicle. According to an aspect the tracking of the second vehicle is further based on identification data of a pre stored vehicle model if the step of comparing identify a matching vehicle. By comparing the identification data with identification data of pre stored vehicle models additional data with a high confidence level score could be obtained if a match is found, since the stored identification data is based on facts of a vehicle.

According to an aspect the method further comprise the step of comparing the obtained identification data of the second vehicle to identification data of a number of pre stored vehicle types, to identify a vehicle type of the second vehicle. According to an aspect the tracking of the second vehicle is further based on identification data of a pre stored vehicle type if the step of comparing identify a matching vehicle. By comparing the identification data with identification data of pre stored vehicle types additional data with a high confidence level score could be obtained if a match is found, since the stored identification data is based on facts of a vehicle.

According to an aspect the obtaining of identification data comprise obtaining/measuring an angle between two parts of the second vehicle, since this is an efficient way of metrics of the second vehicle.

According to an aspect the two parts are corresponding parts of the second vehicle that is present/positioned on two opposite sides, two symmetrically arranged parts or two arbitrary parts of the second vehicle.

According to an aspect the tracking of the position of the second vehicle comprise estimating the angle between the two parts based on a standard/pre-set distance between the two parts. When starting tracking the second vehicle the method does not have a lot of identification data to use and to enhance the possibility to follow the second vehicle the tracking metrics could be calculated based on a standard/pre-set distance, which is much better than not being able to identify the second vehicle.

According to an aspect the obtaining of identification data of the second vehicle comprise obtaining one or more parameters of the colour, the brand, the logo, the number plate, the height, the width, a wifi-network signal, a sticker, a company logo, a roof box, the lights. As these identification data often are more specific than a vehicle model or type, the possibility that the correct second vehicle is followed is increased even if there are many vehicles of the same model or type on a street.

According to an aspect the step of tracking the position of the second vehicle comprise estimating the position of the second vehicle based on prior positions of the second vehicle, if the second vehicle is out of sight of the sensors/camera. By using an estimation of the position the first vehicle can continue to follow the second vehicle even if the sensors or camera cannot identify it.

According to an aspect the method comprise transmitting the tracking metrics of the second vehicle to the navigation system and wherein the navigation system determines the position of the second vehicle based on the prior positions of the second vehicle and the tracking metrics in combination with map data, if the second vehicle is out of sight. By combining the tracking metrics with information from a map for instance, the method could estimate the position of the second vehicle in a better way even if the second vehicle is out of sight. As an example, if the speed of the second vehicle has decreased based on the last known tracking metrics and there is a crossing approaching, the possibility of that the second vehicle will turn at the crossing is larger than if it had kept a continuous speed.

According to an aspect the step of tracking the position of the second vehicle comprise determining if the second vehicle is being obscured by at least one obscuring vehicle, and tracking an estimated position of the second vehicle based on tracking the position of the at least one obscuring vehicle. By using the position of the obscuring vehicle the position the first vehicle can continue to follow the second vehicle even if the sensors or camera cannot identify it.

According to an aspect the method comprise displaying the position of the second vehicle on a user interface of the navigation system as a default path, to reduce the disturbance of the user of the vehicle for following the second vehicle.

According to a second aspect of the invention this is achieved by a system for supporting a user of a first vehicle to follow a second vehicle. The system comprise a memory comprising executable instructions, one or more processors configured to communicate with the memory wherein the one or more processors are configured to cause the system to: obtain a picture by a camera of at least a part of a surrounding the first vehicle, detecting vehicles in the obtained picture, display a representation of the detected vehicles on a user interface to the user, obtain input, via the user interface, from the user of which of the detected vehicles that is the second vehicle and that the user would like to follow, obtain, via the camera, identification data of the second vehicle, track the position of the second vehicle, and transmitting the position of the second vehicle to a navigation system of the first vehicle.

According to a third aspect of the invention this is achieved by a vehicle comprising the system according to the second aspect.

A forth aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

In some embodiments, any of the above aspects may additionally have features identical with or corresponding to any of the various features as explained above for any of the other aspects.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments and aspect of the present disclosure will be described and exemplified more fully hereinafter with reference to the accompanying drawings. The solutions disclosed herein can, however, be realized in many different forms and should not be construed as being limited to the embodiments set forth herein.

In the following, embodiments and aspects will be described where alternative approaches to supporting a user of a vehicle to follow another vehicle are provided.

Figure 1:
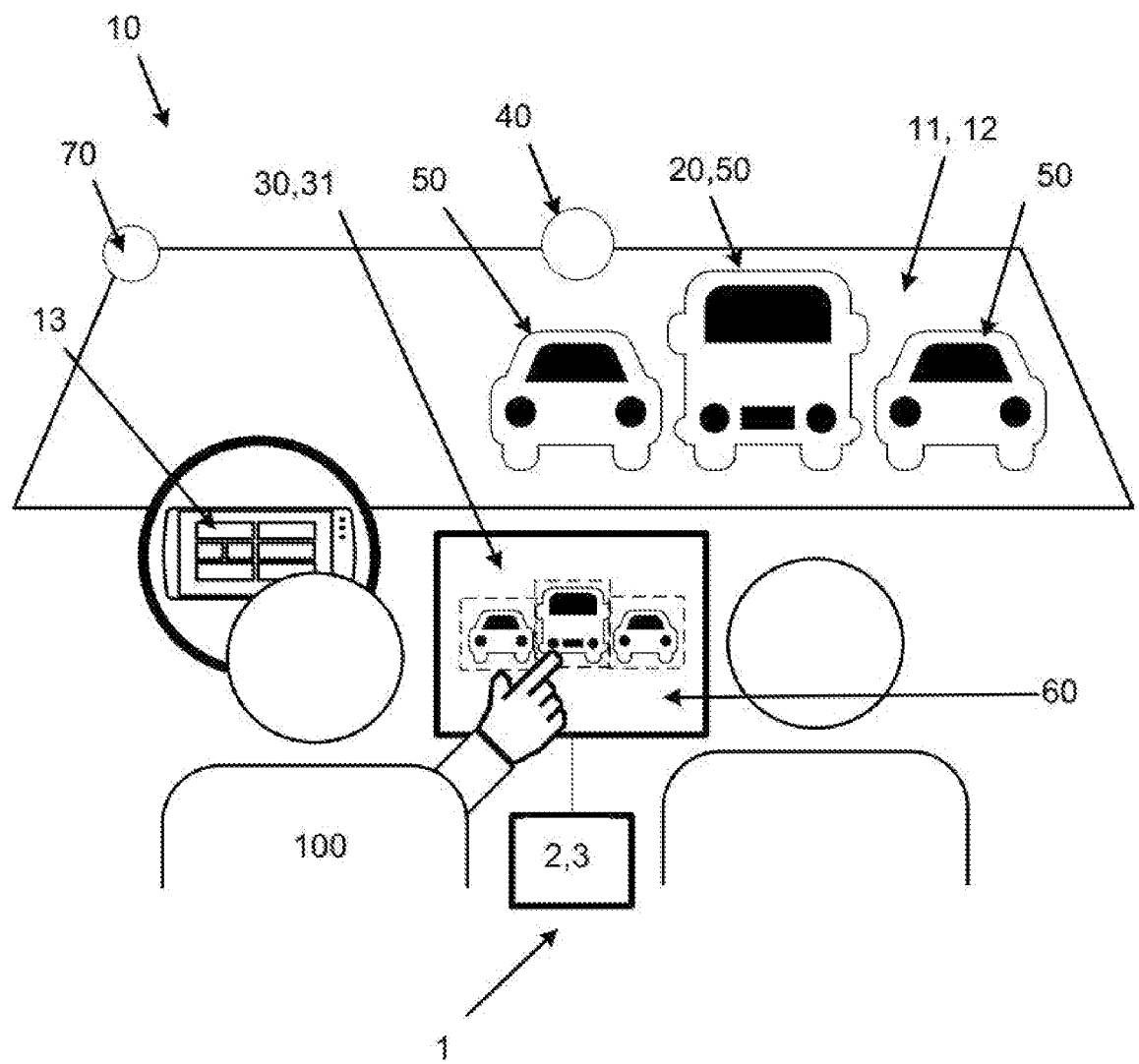
FIG. 1 is a schematic overview illustrating an example vehicle according to some embodiments.

FIG. 1 is a schematic overview of a vehicle 10. A user 100 is riding the vehicle. The vehicle 10 comprises a system 1 for supporting the user 100 of the first vehicle 10 to follow a second vehicle 20. The system 1 comprises a memory 2, one or more processors 3, a camera 40, a user interface 60, one or more sensors 70 and a navigation system 13.

The memory 2 comprises executable instructions. The one or more processors 3 are connected to the memory 2. The one or more processors 3 are configured to communicate with the memory 2.

The camera 40 is configured to obtain a picture 30 of at least a part 11 of a surrounding 12 of the first vehicle 10. According to an aspect the part 11 of the surrounding 12 is a part 11 in front of the vehicle 10. According to an aspect the part 11 of the surrounding 12 is a part 11 at one or both sides of the vehicle 10. According to an aspect the part 11 of the surrounding 12 is a part 11 in the rear of the vehicle 10. According to an aspect the part 11 of the surrounding 12 is the whole surrounding of the vehicle 10.

Figure 5:
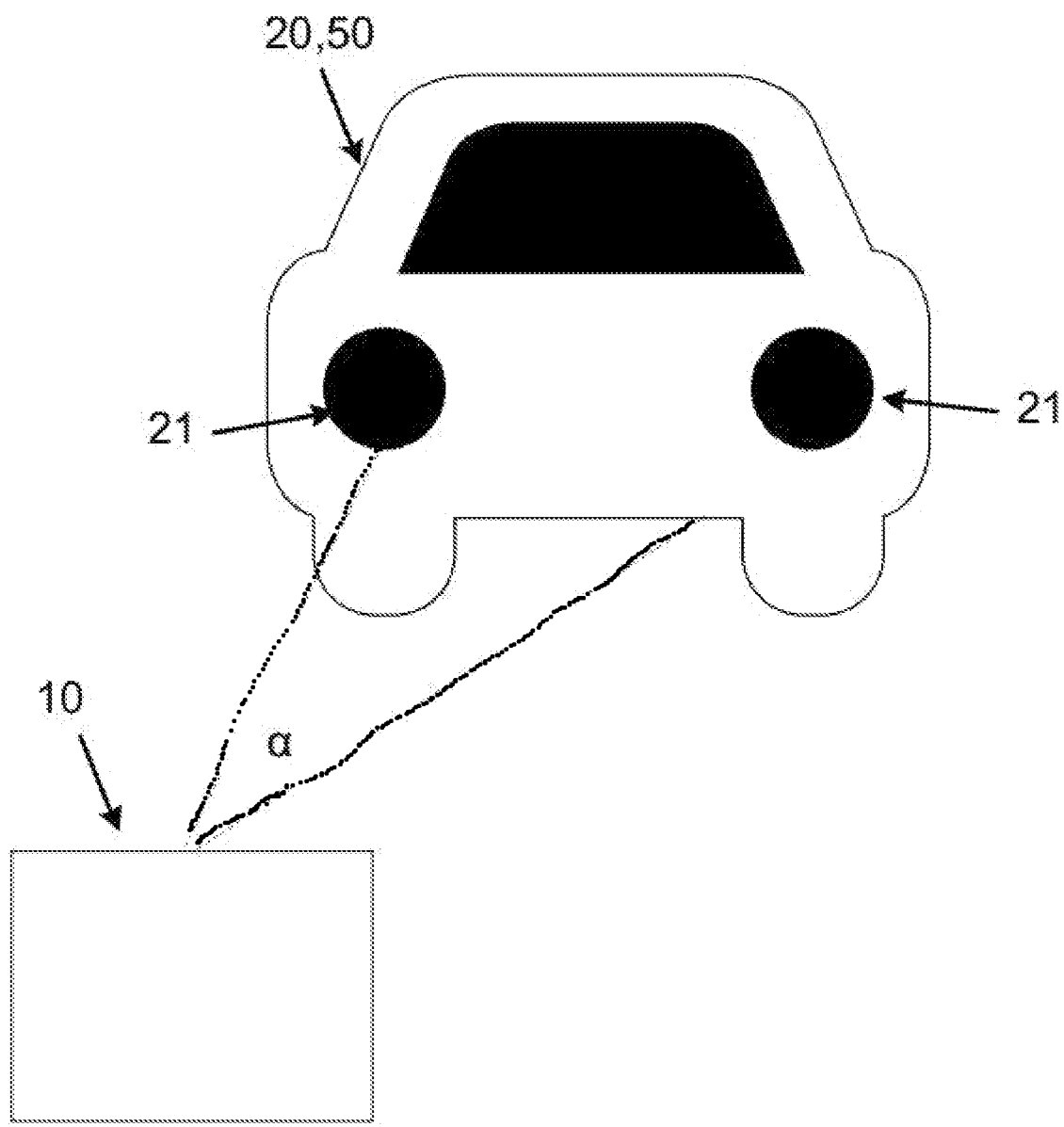

The camera 40 is configured to obtain identification data of the second vehicle 20. The identification data of the vehicle 20 is according to an aspect an angle α between two parts 21 of the second vehicle 20, as is disclosed in FIG. 5. The identification data of the vehicle 20 is according to an aspect a distance between the two parts 21 of the second vehicle 20. The identification data of the vehicle 20 is according to an aspect one or more of the colour, the brand, the logo, the number plate, the height, the width, a wifi-network signal, a sticker, a company logo, a roof box, lights of the second vehicle 20. According to an aspect identification data is data of the second vehicle 20 that is different from other vehicles 50. According to an aspect identification data is data of the second vehicle 20 that is different from other vehicles 50 of the same model as the second vehicle 20. According to an aspect the camera 40 is a camera with machine vision.

According to an aspect the two parts 21 are corresponding parts 21 of the second vehicle 20 that is present/positioned on two opposite sides of the second vehicle 20. According to an aspect the two parts 21 are two symmetrically arranged parts 21 of the second vehicle 20. According to an aspect the two parts 21 are two arbitrary parts 21 of the second vehicle 20. The parts 21 are according to an aspect one or more of a rear view mirror, left and right indicators, tyres, windows, exhaust pipes, lamps, contours, rails, etc.

According to an aspect the angle α between the two parts 21 is calculated based on a standard/pre-set distance between the two parts 21. Put in another way, the angle α is calculated based on a standard distance between two parts 21, such as a standard/basic distance between the rear view mirrors. By using a standard/basic distance for instance the distance to the second vehicle 20 relative to the first vehicle 10 could be estimated with a rather low tolerance even if the actual model or type of the second vehicle, and thus the exact distance, is known.

According to an aspect the tracking of the position of the second vehicle 20 comprise calculating a distance to/position of the second vehicle 20 at least based on the angle α between the two parts 21 and a distance between the two parts obtained from the identification data of the pre stored vehicle model.

According to an aspect the system 1 is configured to primarily using the camera 40 for obtaining identification data, but that once a predetermined threshold of identification data has been reached, correlating camera data with data from the sensors 70, the identification data may also be obtained from the other sensors 70.

According to an aspect the system 1 is configured identify vehicles 20, 50 in the picture 30. According to an aspect the system is configured to identify the vehicles 20, 50 based on identification data of the different vehicles 20, 50 in the picture 30. According to an aspect the system is configured to identify the second vehicle 20 out of the at least one detected vehicles 20, 50 based on identification data of the second vehicle 20.

According to an aspect the system 1 is configured to assign at least one tracking metric to the second vehicle 20. According to an aspect the tracking metric is determined by the camera 40. According to an aspect a tracking metric is one or more of a position, a speed, a heading, a distance, an angle, of the second vehicle 20 relative to the first vehicle 10. According to an aspect the tracking metrics are derivable from the camera with machine vision. It should be understood in this context that the term position includes data that indicate movement, direction etc.

The system 1 comprises one or more sensors 70. According to an aspect the sensor 70 is one or more of a RADAR or a LIDAR. According to an aspect additional tracking metrics obtained from the sensor, such as RADAR, LIDAR, etc. may be aggregated with the obtained identification data. According to an aspect additional tracking metrics obtained from the sensor, such as RADAR, LIDAR, etc. may be aggregated with what is referred to as sensor fusion to achieve aggregate data for tracking metric for the second vehicle 20 when a correlation between sensors indicates a common vehicle, i.e. the second vehicle 20.

The second vehicle 20 is according to an aspect assigned with the tracking metrics that are determined to be the most reliable depending on the situation. It has been realized by the inventors that in some aspects of the invention, the weighing of sensor data which commonly favours radar and LIDAR sensors due to depth perception may preferably be weighed differently to favour tracking metrics from the camera 40 to track the second vehicle 20. In other words, the camera 40 may be a primary sensor for tracking the second vehicle 70.

The user interface 60 is configured to display a representation 31 of the detected vehicles 20, 50. The user interface 60 is configured to receive input from the user 100. The input from the user 100 is according to an aspect input regarding which of the identified vehicles 20, 50 that the user 100 would like to follow. Put in another way the input from the user 100 indicated which of the identified vehicles 20, 50 that is the second vehicle 20 that the user would like to follow. The user interface 60 is according to an aspect configured to receive input from the user 100 by the user 100 touching the user interface 60.

According to an aspect the user interface 60 is a display 60. According to an aspect the user interface 60 is a touch display 60.

According to an aspect the user interface 60 that displays information is different from the user interface 60 that receives information. Put in another way, the system 1 could comprise one or more user interfaces 60.

According to an aspect the system is configured to compare the obtained identification data of the second vehicle to identification data of a number of pre stored vehicle types, to identify a vehicle type of the second vehicle. According to an aspect the tracking of the second vehicle is further based on identification data of a pre stored vehicle type if the step of comparing identify a matching vehicle.

According to an aspect the system is configured to compare the obtained identification data of the second vehicle to identification data of a number of pre stored vehicle models, to identify a vehicle model of the second vehicle. According to an aspect the tracking of the second vehicle is further based on identification data of a pre stored vehicle model if the step of comparing identify a matching vehicle.

According to an aspect the system is configured to compare the obtained identification data of the second vehicle to identification data of a number of pre stored extra components, to identify the second vehicle. According to an aspect the tracking of the second vehicle is further based on identification data of a pre stored extra components, if the step of comparing identify a matching extra component. An extra component could be a roof box, a wing or extra lights.

The system 1 according to an aspect is configured to keep track of which identification data that has been verified on the second vehicle 20. According to an aspect the first obtained identification data may be assigned a higher score/confidence level than a subsequently obtained identification data is assigned. According to an aspect the score or confidence level of identification data is based on the frequency of camera frames that it is obtainable. According to an aspect the score or confidence level of identification data is based on consistency of the data within a predetermined tolerance range. According to an aspect the score or confidence level of identification data is based the resolution available while obtaining the data. According to an aspect the score or confidence level of identification data is based, if the second vehicle is in close proximity, more pixels will be available to determine the angle or a character on a registration plate, etc. and this may be the basis for assigning a higher score/confidence level. Alternatively, analogous indications of a higher score/confidence level may be the basis for increasing said score/confidence level of a previously obtained identification data.

According to an aspect the one or more processors 3 are configured to cause the system to: obtain a picture by the camera 40 of at least a part 11 of a surrounding 12 the first vehicle 10, detecting vehicles 20, 50 in the obtained picture, display a representation of the detected vehicles 20, 50 on a user interface 60 to the user, obtain input via the user interface 60 from the user of which of the detected vehicles 20, 50 that is the second vehicle 20 and that the user would like to follow, obtain, via the camera 40, identification data of the second vehicle 20, track the position of the second vehicle 20, and transmitting the position of the second vehicle 20 to a navigation system 13 of the first vehicle 10.

Figure 2:
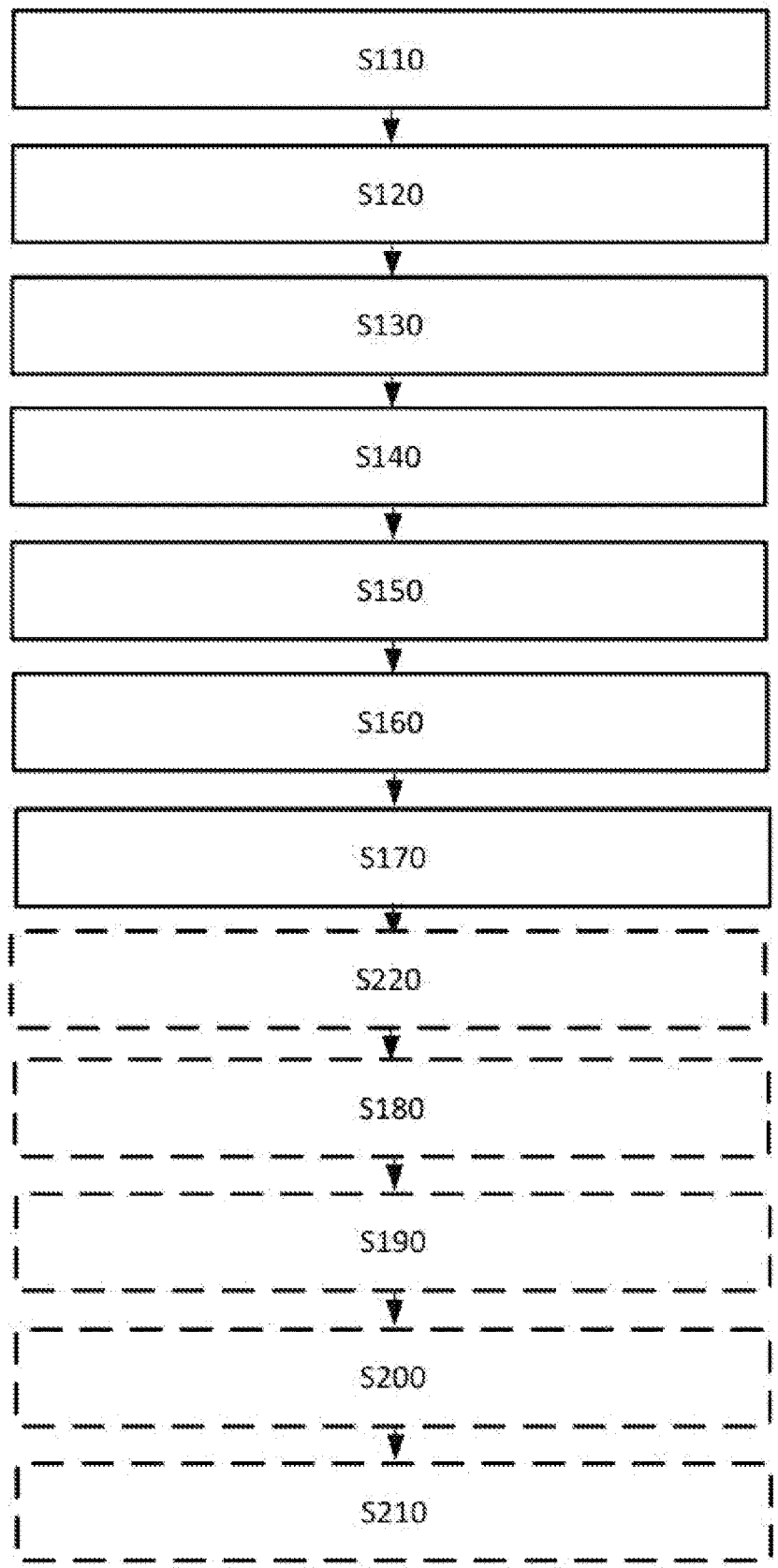
FIG. 2 is a schematic block diagram illustrating a method according to an aspect of the invention.
Figure 3:
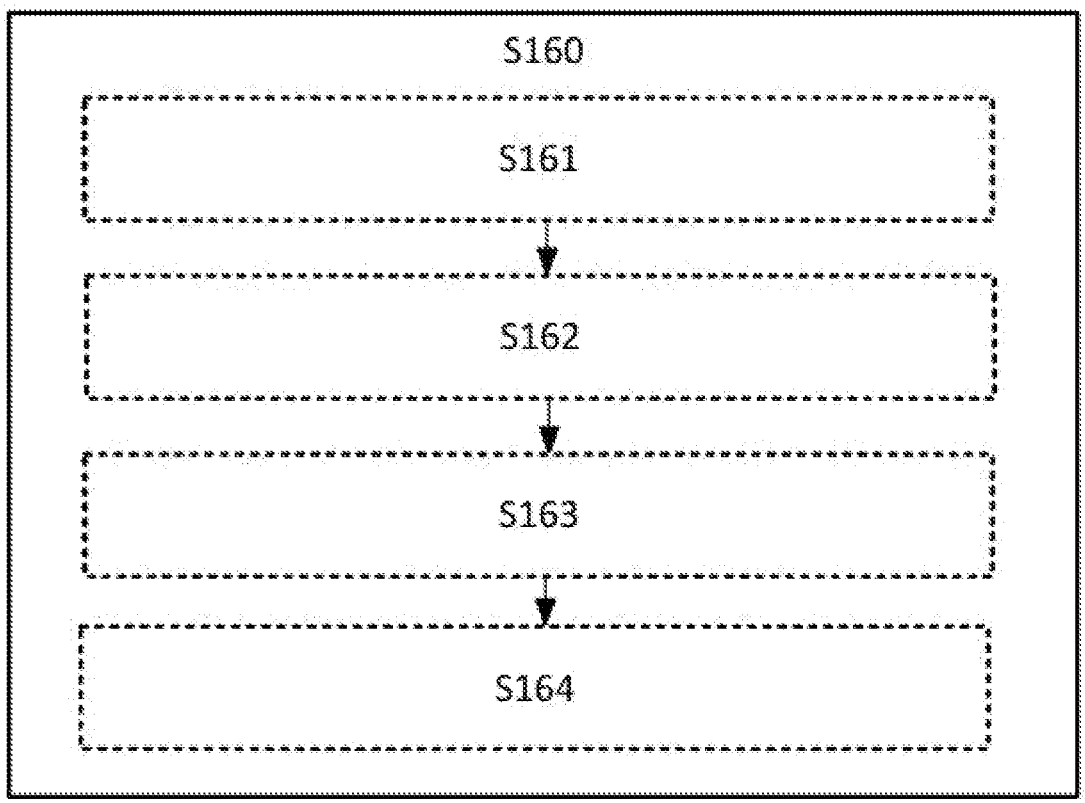
FIG. 3 is a schematic block diagram illustrating an aspect of the method.
Figure 4:
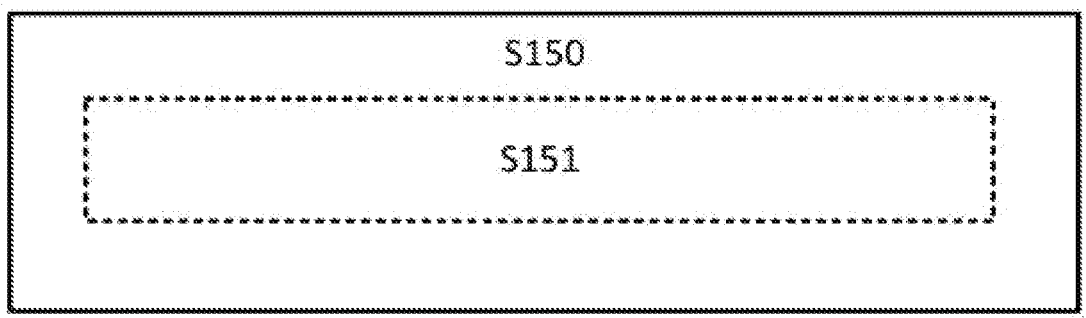
FIG. 4 is a schematic block diagram illustrating an aspect of the method, FIG. 5 a schematic overview illustrating the position between two vehicles according to an aspect of the invention.

Hereafter a method for supporting the user 100 of the first vehicle 10 to follow the second vehicle 20 will be described with reference to FIG. 2-4.

The method comprise the steps of: obtaining S110 a picture 30 of at least the part 11 of the surrounding 12 of the first vehicle 10. The picture 30 is obtained S110 by the camera 40. Thereafter the step of detecting S120 vehicles 20, 50 in the obtained picture 30 is performed.

A representation 31 of the detected vehicles 20, 50 are displayed S130 to the user 100 on the user interface 60. Input from the user 100 is obtained S140 from the user from the user interface 60 of which of the detected vehicles 20, 50 that is the second vehicle 20 and that the user would like to follow. According to an aspect the user interface 60 comprise two or more separate user interfaces 60. According to an aspect the user interface 60 comprise at least one display and one touch screen.

The camera 40 obtains S150 at least one identification data of the second vehicle 20. The position of the second vehicle 20 is thereafter tracked S160 and the position of the second vehicle 20 is transmitted S170 to the navigation system 13 of the first vehicle 10.

According to an aspect the step of tracking S160 is at least based on identifying S161 the second vehicle 20 from the at least one detected vehicles 20, 50 based on identification data of the second vehicle 20, and assigning S162 at least one tracking metric determined by the camera 40 to the second vehicle 20.

According to an aspect the step of assigning S162 at least one tracking metric comprise obtaining S110 two or more pictures 30 of the at least part 11 of the surrounding 12 of the first vehicle 10 and identifying the position of the second vehicle 20 based on identifying the identification data of the second vehicle 20 in the pictures 30 and determine the tracking metrics based on the position of the second vehicle 20 in the two or more pictures 30.

According to an aspect the tracking metrics is further determined based on input from one or more sensors 70 of the first vehicle 10. As the tracking metrics are based on more input and identification data, the accuracy of the tracking metrics could be enhanced.

According to an aspect the step of the step of obtaining S150 comprise obtaining S150 further identification data of the second vehicle 20 during the tracking S160 of the second vehicle 20.

According to an aspect the identification data is assigned a confidence level score based on the uniqueness of the identification data. The uniqueness may be quantified according to a predetermined scale. For example, the number plate of a vehicle may be considered to have a high level of uniqueness and the width of the vehicle may be considered to have a low level of uniqueness.

According to an aspect the method further comprise the step of comparing S180 the obtained identification data of the second vehicle 20 to identification data of a number of pre stored vehicle models, to identify a vehicle model of the second vehicle 20. According to an aspect the method further comprise the step of comparing S180 the obtained identification data of the second vehicle 20 to identification data of a number of pre stored vehicle types, to identify a vehicle type of the second vehicle 20. The identification data of the pre stored vehicle models and/or types is according to an aspect stored on a memory in the first vehicle. The identification data of the pre stored vehicle models and/or types is according to an aspect stored on a cloud service that the first vehicle 10 could be connected to. The identification data of the pre stored vehicle models and or types is according to an aspect stored on a server that the first vehicle 10 could be connected to. An advantage of storing vehicle models and/or types on a server or a cloud platform may be that such a server or cloud may be continuously updated with new vehicle models in a more easy manner than a storage memory in the first vehicle.

According to an aspect the tracking S160 of the second vehicle 20 is further based on identification data of a pre stored vehicle model and/or type, if the step of comparing S180 identify a matching a vehicle out of the pre stored vehicle models and/or type.

According to an aspect the obtaining S150 of identification data comprise obtaining/measuring S151 an angle α between two parts 21 of the second vehicle 20.

According to an aspect the tracking S160 of the position of the second vehicle 20 comprise estimating S163 the angle α between the two parts 21 based on a standard/pre-set distance between the two parts 21.

According to an aspect the obtaining S150 of identification data of the second vehicle 20 comprise obtaining one or more parameters of the colour, the brand, the logo, the number plate, the height, the width, a wifi-network identifier (e.g. MAC-address), a sticker, a company logo, a roof box, lights. The lights may for example be distinct in shape, position and or distribution, such that a vehicle model or model year can be identified and assigned as identification data of the second vehicle 20. Furthermore as an example, a second sensor may be used to identify a MAC-address and assign this address as identification data of the second vehicle. Analogously, a radar sensor may provide some data that allow target identification. Furthermore, identification data from secondary sensors may for example be used by correlating tracking metrics from the secondary sensor with tracking metrics from the camera and accordingly quantifying a confidence level of identification data from secondary sensors.

According to an aspect the step of tracking S160 the position of the second vehicle 20 comprise estimating the position of the second vehicle based on prior positions of the second vehicle, if the second vehicle is out of sight of the sensors/camera.

According to an aspect the method comprises the step of transmitting S190 the tracking metrics of the second vehicle 20 to the navigation system 13. According to an aspect the method comprises the step of inserting S220 the position of the second vehicle 20 as a destination for the navigation system 13 of the first vehicle 10 to guide the first vehicle towards. The position of the second vehicle 20 is used as the destination for the navigation system 13 and by continuously inserting the position of the second vehicle 20 as the destination of the navigation system 13, the navigation system 13 will guide the user of the first vehicle 10 towards the position of the second vehicle 20, i.e. follow the second vehicle 20. As an example, the position of the second vehicle 20 is inserted as the destination of the navigation system 13 instead of an actual address. Put in another way, instead of inserting a fixed address, such as "Lindholmen in Gothenburg", as the destination of the navigation system 13, the position of the second vehicle 20 is inserted S220 as the destination. As the position of the second vehicle 20 is tracked S160 the position of the second vehicle 20 is updated and could be continuously inserted 220 in the navigation system 13. The navigation system 13 guides the user of the first vehicle 13 towards a moving/changing destination, i.e. towards the changing position of the second vehicle 20. The user of the first vehicle 10 does not need to focus on the actual position of the second vehicle 20, the user only needs to follow the directions from the navigation system 13 and can focus more on the traffic surrounding the first vehicle 10. This will reduce any distraction of the user from focusing on the vehicles at the immediate surroundings of the first vehicle 10.

According to an aspect the tracking S160 of the second vehicle 20 could be performed even if there are one or more other vehicles between the first vehicle 10 and the second vehicle 10 as long as at least one identification data of the second vehicle 20 is identified. Put in another way, as long as at least some part of the second vehicle 20 is identified, the position of the second vehicle 20 is tracked. The tracking S160 is even performed if there is an interruption in the identification data of the second vehicle 20, such as if a further vehicle is positioned between the first and second vehicle 10, 20 or if the second vehicle 20 has made a turn. The last known tracked position of the second vehicle 20 could be used as the destination of the navigation system 13 until the actual position of the last known position of the second vehicle 20 is reached. If the last known position of the second position 20 is reached, the position of the second vehicle 20 could be estimated, based on traffic flow, maps etc., and the estimated position of the second vehicle 20 could be used as the destination of the navigation system 13 until the second vehicle 20 again is detected and further identification data could be obtained.

The navigation system 13 according to an aspect determines S200 the position of the second vehicle 20 based on the prior positions of the second vehicle 20 and the tracking metrics in combination with map data, if the second vehicle 20 is out of sight. By using prior known positions of the second vehicle and tracking metrics together with map data the first vehicle 10 could follow the second vehicle 20 with a high probability even if the second vehicle 20 is out of sight. If the second vehicle 20 is traveling at a high speed when approaching a crossing this is an indication of that the second vehicle 20 will not make a turn at the crossing. However, if the second vehicle 20 has started to slow down when approaching the crossing this could be an indication of that the second vehicle will make a turn at the crossing.

According to an aspect the step of tracking S160 the position of the second vehicle 20 comprise determining S164 if the second vehicle 20 is being obscured by at least one obscuring vehicle 50, and tracking S160 an estimated position of the second vehicle 20 based on tracking S160 the position of the at least one obscuring vehicle.

According to an aspect the first vehicle 10 will follow a default path of a street/road if the second vehicle 20 is out of sight. By follow the default path it increases the possibility to take the same path as the second vehicle 20 and to identify the second vehicle 20 again, instead of stopping if the second vehicle is lost.

Furthermore, it may be assumed that in a situation where the second vehicle changes route it may in the process become trackable again so that the default path may be corrected. Similarly it may be assumed that in a situation where the at least one obscuring vehicle changes route the second vehicle may become trackable analogously. Alternatively, any change in route by the at least one obscuring vehicle, as can be determined by map data, may trigger a search for the characteristic identifying data of the second vehicle.

According to an aspect the method comprise displaying S210 the position of the second vehicle 20 on a user interface of the navigation system 13 as default path.

Hereafter follows an example of the system and the method from a user perspective. The user 100 of the first vehicle 10 that would like to follow the second vehicle 20, initiate the system 1. The camera 40 of the system will take, i.e. obtaining, a picture of the area in front of the first vehicle 10. The picture 30 or a representation of the picture 31 will be displayed on a display in the first vehicle 10. The picture 30 will contain one or more vehicles 20, 50 or representations of vehicles 20, 50, i.e. animations, drawings or abstract pictures of vehicles 20, 50 that corresponds to the vehicles

20, 50 that the user 100 is seeing through the wind shield of the first vehicle 10. The user 100 then presses on the vehicle that the user would like to follow, i.e. input information of which if the vehicles 20, 50 that is the second vehicle 50 that the user would like to follow. The system 1 thereafter starts obtaining identification data and sending tracking metrics to the navigation system 13. After the user 100 has pressed on the vehicle 20, 50 on the user interface 60, the navigation system is initiated and the second vehicle 20 will be seen as the destination of the navigation system 13. The user 100 thus not have to follow the second vehicle 20 when driving the vehicle and could focus on the other vehicles on the road to travel safe. The user 100 only needs to follow the instructions from the navigation system 13 to follow the second vehicle 20.

According to an aspect the first vehicle 10 is an autonomous driving vehicle 10 and the position of the second vehicle 20 is used as the destination for the autonomous driving vehicle.

Generally, when an arrangement is referred to herein, it is to be understood as a physical product; e.g., an apparatus or a system. The physical product may comprise one or more parts, such as controlling circuitry in the form of one or more controllers, one or more processors, or the like.

The described embodiments, aspect and their equivalents may be realized in software, hardware, or a combination thereof. The embodiments may be performed by general-purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general-purpose circuitry and/or the specialized circuitry may, for example, be associated with or comprised in an apparatus such as a vehicle.

Embodiments and aspect may appear within an electronic apparatus (associated with or comprised in a vehicle) comprising arrangements, circuitry, and/or logic according to any of the embodiments described herein. Alternatively or additionally, an electronic apparatus (associated with or comprised in a vehicle) may be configured to perform methods according to any of the embodiments described herein.

According to some embodiments, a computer program product comprises a computer readable medium such as, for example a universal serial bus (USB) memory, a plug-in card, an embedded drive or a read only memory (ROM). The computer readable medium has stored thereon a computer program comprising program instructions. The computer program is loadable into a data processor (PROC), which may, for example, be comprised in an apparatus or vehicle 10. When loaded into the data processing unit, the computer program may be stored in a memory (MEM) associated with or comprised in the data-processing unit. According to some embodiments, the computer program may, when loaded into and run by the data processing unit, cause execution of method steps according to, for example, any of the methods illustrated in FIG. 2-4 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

What is claimed is:

1. A method for supporting a user of a first vehicle to follow a second vehicle, comprising the steps of:
    obtaining a picture, by a camera, of at least a part of a surrounding of the first vehicle,
    detecting vehicles in the obtained picture,
    displaying a representation of the detected vehicles on a user interface to the user,
        obtaining input from the user, via the user interface, which of the detected vehicles is the second vehicle and that the user would like to follow,
    obtaining, via the camera, at least one identification data of the second vehicle, tracking a position of the second vehicle, and transmitting the position of the second vehicle to a navigation system of the first vehicle, and
    wherein the step of tracking the position of the second vehicle is based on data from at least one of the camera or a sensor, and tracking the position of the second vehicle comprises estimating the position of the second vehicle based on prior positions of the second vehicle if the second vehicle moves out of sight of the camera or sensor.

2. The method according to claim 1, wherein the step of tracking is at least based on identifying the second vehicle from the at least one detected vehicles based on identification data of the second vehicle, and
    assigning, to the second vehicle, at least one tracking metric determined by the camera.

3. The method according to claim 2, wherein the step of assigning at least one tracking metric comprise obtaining two or more pictures of the at least part of the surrounding of the first vehicle and identifying the position of the second vehicle based on identifying the identification data of the second vehicle in the pictures and determine the tracking metrics based on the position of the second vehicle in the two or more pictures.

4. The method according to claim 2, wherein the tracking metrics is further determined based on input from one or more sensors of the first vehicle.

5. The method according to claim 2, wherein the tracking metrics is one or more of a position, a speed, a heading, a distance, or an angle of the second vehicle relative to the first vehicle.

6. The method according to claim 1, comprising the step of inserting the position of the second vehicle as a destination for the navigation system of the first vehicle to guide the first vehicle towards.

7. The method according to claim 1, wherein the step of obtaining comprise obtaining further identification data of the second vehicle during the tracking of the second vehicle.

8. The method according to claim 1, wherein the identification data is assigned a confidence level score based on uniqueness of the identification data.

9. The method according to claim 1, further comprising the step of comparing the obtained identification data of the second vehicle to identification data of a number of pre stored vehicle models, to identify a vehicle model of the second vehicle.

10. The method according to claim 9, wherein the tracking of the second vehicle is further based on identification data of a pre stored vehicle model if the step of comparing identifies a matching vehicle.

11. The method according to claim 1, wherein the obtaining of identification data comprises determining an angle between two parts of the second vehicle.

12. The method according to claim 11, wherein the two parts are corresponding parts of the second vehicle that are on two opposite sides, are two symmetrically arranged parts or are two arbitrary parts of the second vehicle.

13. The method according to claim 11, wherein the tracking of the position of the second vehicle comprises estimating the angle between the two parts based on a predetermined distance between the two parts.

14. The method according to claim 1, wherein the obtaining of identification data of the second vehicle comprises obtaining one or more parameters of a colour, a brand, a logo, a number plate, a height, a width, a wifi-network signal, a sticker, a company logo, a roof box or lights.

15. A method for supporting a user of a first vehicle to follow a second vehicle, comprising the steps of:
obtaining a picture, by a camera, of at least a part of a surrounding of the first vehicle,
detecting vehicles in the obtained picture,
displaying a representation of the detected vehicles on a user interface to the user,
obtaining input from the user, via the user interface, which of the detected vehicles is the second vehicle and that the user would like to follow,
obtaining, via the camera, at least one identification data of the second vehicle,
tracking a position of the second vehicle based on identifying the second vehicle from the at least one detected vehicles based on identification data of the second vehicle,
assigning, to the second vehicle, at least one tracking metric determined by the camera,
transmitting the position of the second vehicle to a navigation system of the first vehicle, and
transmitting the at least one tracking metric the second vehicle to the navigation system, and
wherein the navigation system determines the position of the second vehicle based on the prior positions of the second vehicle and the at least one tracking metric in combination with map data, if the second vehicle is out of sight of the camera.

16. A method for supporting a user of a first vehicle to follow a second vehicle, comprising the steps of:
obtaining a picture, by a camera, of at least a part of a surrounding of the first vehicle,
detecting vehicles in the obtained picture, displaying a representation of the detected vehicles on a user interface to the user,
obtaining input from the user, via the user interface, which of the detected vehicles is the second vehicle and that the user would like to follow,
obtaining, via the camera, at least one identification data of the second vehicle, tracking a position of the second vehicle, and transmitting the position of the second vehicle to a navigation system of the first vehicle,
wherein the step of tracking the position of the second vehicle comprises determining if the second vehicle is obscured by at least one obscuring vehicle, and
tracking an estimated position of the second vehicle based on tracking the position of the at least one obscuring vehicle.

17. The method according to claim 1, further comprising displaying the position of the second vehicle on a user interface of the navigation system as a default path.

* * * * *